United States Patent
Wiseman et al.

(10) Patent No.: US 10,057,223 B2
(45) Date of Patent: Aug. 21, 2018

(54) DATA PROTECTION KEYS

(71) Applicant: Intel Corporation, Santa Clara, CA (US)

(72) Inventors: Willard M. Wiseman, Tigard, OR (US); Philip B. Tricca, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/866,901

(22) Filed: Sep. 26, 2015

(65) Prior Publication Data
US 2017/0093800 A1 Mar. 30, 2017

(51) Int. Cl.
H04L 29/06 (2006.01)
H04L 9/32 (2006.01)
G06F 21/57 (2013.01)

(52) U.S. Cl.
CPC .......... H04L 63/045 (2013.01); G06F 21/57 (2013.01); H04L 9/3247 (2013.01); H04L 63/0853 (2013.01); H04L 63/126 (2013.01); H04L 2209/127 (2013.01)

(58) Field of Classification Search
CPC ............. H04L 2209/127; H04L 9/3234; H04L 9/3247; G06F 21/57
See application file for complete search history.

(56) References Cited

U.S. PATENT DOCUMENTS

| | | | | |
|---|---|---|---|---|
| 7,330,977 B2* | 2/2008 | Cromer | .................. | G06F 21/78 713/189 |
| 7,574,600 B2* | 8/2009 | Smith | .................. | H04L 63/166 380/255 |
| 2005/0289347 A1* | 12/2005 | Ovadia | ................. | H04L 9/0877 713/171 |
| 2008/0098107 A1* | 4/2008 | Jones | .................. | H04L 63/1425 709/224 |
| 2008/0256595 A1 | 10/2008 | Schunter et al. | | |
| 2008/0320308 A1 | 12/2008 | Kostiainen et al. | | |
| 2010/0325628 A1 | 12/2010 | Haga et al. | | |
| 2013/0239222 A1 | 9/2013 | Proudler et al. | | |
| 2014/0215202 A1* | 7/2014 | Paris | ...................... | G06F 17/30 713/100 |

OTHER PUBLICATIONS

International Search Report and Written Opinion issued in PCT Application No. PCT/US2016/049134, dated Nov. 23, 2016.
International Preliminary Report on Patentability and Written Opinion issued in PCT Application No. PCT/US2016/049134, dated Apr. 5, 2018, 10 pages.

* cited by examiner

*Primary Examiner* — Dao Q Ho
(74) *Attorney, Agent, or Firm* — Grossman, Tucker, Perreault & Pfleger, PLLC

(57) ABSTRACT

One embodiment provides a client device. The client device includes a Trusted Platform Module (TPM). The TPM includes a secure controller to extend a secure hash digest with at least a portion of a data stream or a hash of the at least a portion of the data stream.
Another embodiment provides a server system. The server system includes verifier logic. The verifier logic is to verify that an attestation identity key (AIK) public key associated with a received Trusted Platform Module (TPM) quote corresponds to an authenticated client device.

7 Claims, 4 Drawing Sheets

DATA PROTECTION KEYS

FIELD

The present disclosure relates to data protection, in particular to, data protection keys.

BACKGROUND

Data, i.e., electronic data, may be communicated between one or more client device(s) and a server system. The client device(s) may be adjacent to or remote from the server system. In order to communicate, a communication link may be established between the client device and the server system. Corresponding attestation and authentication techniques may allow the server system to identify the client device and to permit only authorized client devices to connect. Such techniques may not, however, provide assurance that data received by the server system is actually from the authenticated client device.

BRIEF DESCRIPTION OF DRAWINGS

Features and advantages of the claimed subject matter will be apparent from the following detailed description of embodiments consistent therewith, which description should be considered with reference to the accompanying drawings, wherein:

Figure 1:
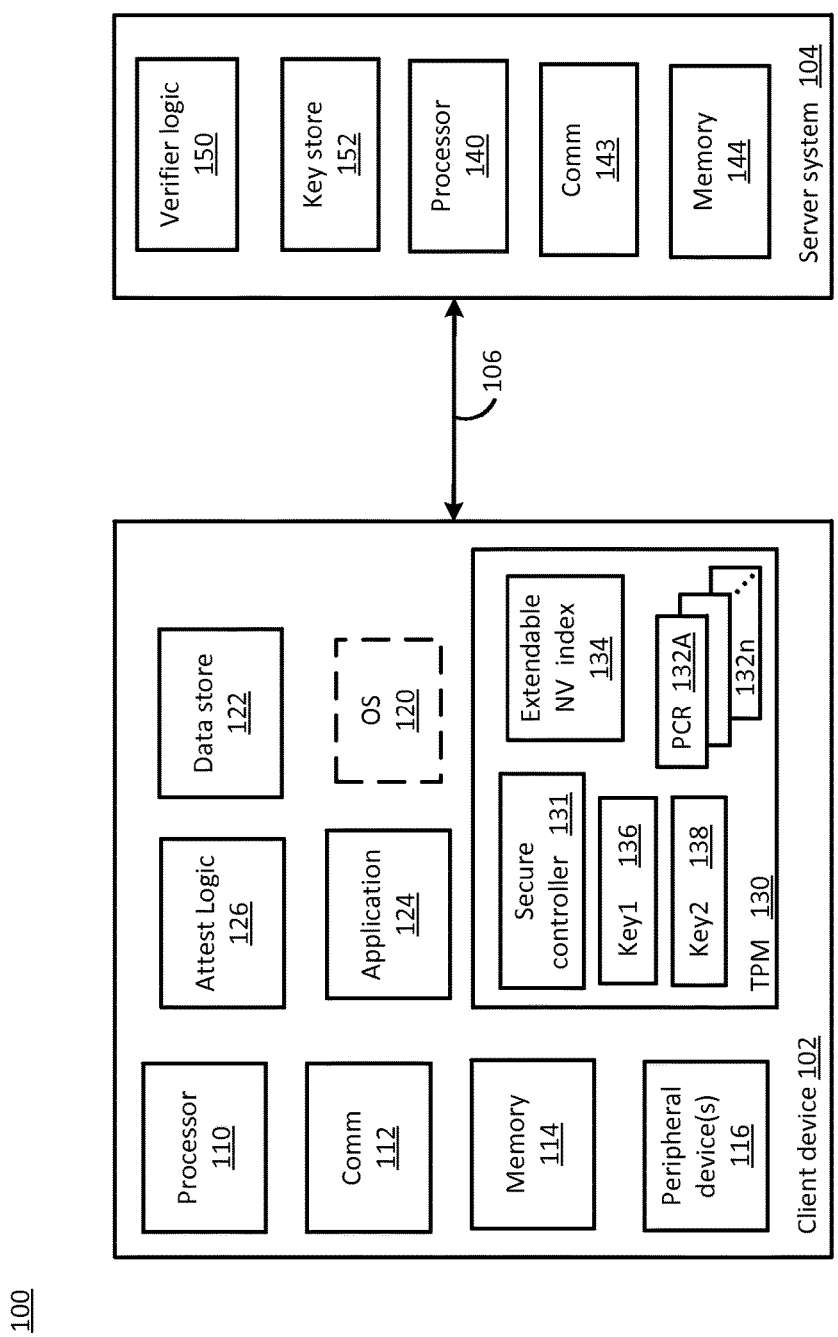
FIG. 1 illustrates a functional block diagram of a data protection system consistent with several embodiments of the present disclosure.

Although the following Detailed Description will proceed with reference being made to illustrative embodiments, many alternatives, modifications, and variations thereof will be apparent to those skilled in the art.

DETAILED DESCRIPTION

A server system may be configured to require that a client device authenticate (i.e., "prove" its identity) and to confirm the client device's integrity prior to allowing the client device to connect to the server system. An attestation identity key (AIK) may be utilized to prove the identity and the integrity of the client device to the server system. An AIK is an asymmetric key pair (i.e., public key and private key) whose private key is contained within a trusted platform module (TPM) included in the client device. The TPM may comply and/or be compatible with one or more TPM specifications and/or standards, as described herein.

The AIK private key may only sign data that is internal to the TPM that contains the AIK. As used herein, signing corresponds to generating a digital signature. A digital signature utilizes an asymmetric cryptographic key pair. Signing includes encrypting a message (that may correspond to data) and/or a hash of the message with a private key to create a signature. The message and the signature may then be transmitted to a receiver. The receiver may then decrypt the signature using the public key of the asymmetric key pair and compare the decrypted result to the received message or hash the decrypted result and compare the hash of the decrypted result to the received hash.

The AIK public key may be utilized by the server system to verify, i.e., authenticate, the identity of the client device. Once the identity of the client device, and optionally its firmware and/or software, has been verified, an application executing on the server system may communicate with the client device. Verifying the identity of the client device does not also verify, i.e., authenticate, data (e.g., a data stream) that may be received from (or may appear to be from) the client device. In other words, authentication of the identity of the client device does not ensure security of received data.

Generally, this disclosure relates to protecting data (e.g., a data stream) that may be received by a server system from a client device. An apparatus, method and/or system are configured to facilitate verification by a receiver, e.g., a server system, that a source of received data is an authenticated client device An AIK private key associated with the authenticated client device may be utilized to sign a platform configuration register (PCR) value, i.e., a secure hash digest, associated with the data stream. Signing a PCR value with an AIK private key corresponds to performing a quote operation. The secure hash digest may be stored in a PCR or extendable NV (nonvolatile) index contained in the TPM. The AIK private key may utilized directly to sign the hash digest or indirectly to certify a second key (i.e., a second AIK private key) and the second key may then be utilized to sign the secure hash digest, i.e., PCR value or extendable NV index value.

The AIK private key may be stored in a key slot contained within the TPM that is contained in the client device. An AIK private key may only be used to attest to (i.e., sign) values that are contained in the TPM, e.g., stored by a PCR or extendable NV index. An AIK is configured to attest to the identity of the client device and to provide proof of integrity of one or more integrity metrics (e.g., related to boot components) associated with the client device. An apparatus, method and/or system consistent with the present disclosure are configured to further utilize the AIK to protect the data stream from the client device (e.g., to verify that the client device is the source of a received data stream). Thus, the AIK may be utilized not only to authenticate the identity of the client device and/or the client device's firmware and/or software but also to verify that the authenticated client device was the source of the received data stream.

For example, an apparatus, method and/or system consistent with the present disclosure may protect against untrusted firmware that may modify data prior to signing. In other words, verifying, i.e., attempting to authenticate, such an trusted firmware may fail, thus, providing an indication that the firmware is not trustworthy. In another example, an apparatus, method and/or system consistent with the present disclosure may protect against substituted devices. In other words, utilizing an AIK, whether a device has been substituted for an authenticated client device and/or whether data is from a substituted device may be evident as a result of verification operations.

A data stream, a portion of a data stream and/or a hash digest of at least a portion of the data stream may be provided to the TPM included in the client device. The TPM, e.g., secure controller, may then be configured to perform a quote operation on the received digest. A quote operation includes cryptographically signing the contents of a PCR (or extendable NV index) utilizing the AIK private key. The quote may then be provided to the server system and used to"

verify the received data stream. The quote may be provided to the server system with the data stream and/or following the data stream. The server system may be configured to identify the AIK used to perform the quote operation and to confirm that the AIK used in the attestation protocol is the same AIK used to protect the data. The security provided by the TPM and the AIK may thus be exploited to confirm that the data originated from the authenticated client device.

FIG. 1 illustrates a functional block diagram of a data protection system 100 consistent with several embodiments of the present disclosure. The data protection system 100 includes a client device 102 and a server system 104. The client device 102 may be coupled to the server system 104 via a communication link, e.g., communication link 106.

Client device 102 may include, but is not limited to, a mobile telephone including, but not limited to a smart phone (e.g., iPhone®, Android®-based phone, Blackberry®, Symbian®-based phone, Palm®-based phone, etc.); a wearable device (e.g., wearable computer, "smart" watches, smart glasses, smart clothing, etc.) and/or system; an Internet of Things (IoT) networked device including, but not limited to, a sensor system (e.g., environmental, position, motion, etc.) and/or a sensor network (wired and/or wireless); a computing system (e.g., a server, a workstation computer, a desktop computer, a laptop computer, a tablet computer (e.g., iPad®, GalaxyTab® and the like), an ultraportable computer, an ultramobile computer, a netbook computer and/or a subnotebook computer; etc.

Client device 102 includes a processor 110, a communication interface 112, memory 114, peripheral devices 116, attest logic 126 and TPM 130. Client device 102 may further include an operating system (OS) 120, a data store 122 and/or an application 124. The processor 110 is configured to perform operations associated with client device 102. Processor 110 may include, but is not limited to, a microprocessor, a microcontroller, an application specific integrated circuit (ASIC), application specific instruction processor (ASIP), etc. Communication interface 112 may comply and/or be compatible with one or more, wired and/or wireless, communication protocols. The communication interface 112 is configured to couple client device 102 to communication link 106 and server system 104. Peripheral devices 116 may include, but are not limited to, sensors, data acquisition devices, storage devices, a user interface (e.g., keyboard, a keypad, mouse, touchpad, display, touch sensitive display, etc.), etc. The data store 122 may be configured to store data. For example, the data may be acquired using peripheral devices 116, stored to data store 122 and then transmitted continuously, periodically or intermittently via communication link 106 to server system 104. The data may be related to application 124.

The TPM 130 may comply and/or be compatible with one or more TPM standards, as described herein. TPM 130 includes a secure controller 131 and a plurality of AIK private keys, e.g., key1 136 and key2 138. The secure controller 131 is configured to manage operations of TPM 130. A TPM, e.g., TPM 130, is configured to store one or more AIK private keys in one or more corresponding key slots. Each key slot may be configured to store one AIK private key.

The TPM 130 may further include a plurality of platform configuration registers (PCR) 132A, . . . 132n. PCRs may be resettable or non-resetting. The TPM 130 may include a plurality of NV indexes. An NV index is configured to allow an application, e.g., application 124 and/or attest logic 126, to allocate storage in TPM 130, assign it an index and select associated security and/or functional properties. In some embodiments, TPM 130 may include one or more extendable NV indexes, e.g., extendable NV index 134. An extendable NV index may be configured with similar operating constraints as a PCR has. For example, an extendable NV index may not be directly written to. Information is conveyed to the extendable NV index via an extend operation, as described herein. Operations associated with data protection keys, consistent with the present disclosure, are directed to PCRs and/or extendable NV indexes.

At least some of the PCRs 132A, . . . and/or 132n may be restricted to use by the TPM 130 to support monitoring one or more integrity metrics, as described herein. One or more PCR(s) and one or more extendable NV indexes may be available for use by an application, e.g., application 124. Operations associated with a PCR and/or an extendable NV index may be generally more restrictive than operations associated with the NV indexes. Operations associated with extendable NV indexes may be restricted similar to operations associated with PCRs. For example, a PCR and/or an extendable NV index may not be directly written to. Information is provided to a selected PCR and/or extendable NV index using an extend operation, as described herein. In other words, an extendable NV index may have selected security and functional properties similar to a PCR. Such properties may be allocated by, e.g., OS 120. The restrictions related to usage of PCRs and extendable NV indexes is configured to provide security and integrity associated with the TPM.

PCR(s) 132A, . . . , 132n are configured to store PCR value(s). One or more of the PCR value(s) may be generated based, at least in part, on a hardware and firmware configuration of client device 102 and based, at least in part, on a boot sequence associated with booting client device 102. For example, PCR values associated with the boot sequence may be generated by performing successive extend operations during the boot process. In an extend operation, a new value, conveyed to the TPM 130 as part of the extend operation, is concatenated with the current PCR value. A secure hash algorithm, e.g., SHA1, is then applied to the concatenated values and the result, a new PCR value, is stored in the PCR. The result, i.e., the new PCR value, becomes the current PCR value for a next iteration. As each component in the boot sequence is activated, a hash digest of an image (e.g., firmware) of the component is concatenated with a current PCR value, a secure hash of the combination is then performed and the result is stored to the respective PCR. Thus, at the end of the boot sequence, the stored PCR value provides a secure representation of the components that booted. The stored PCR value may thus correspond to an accumulation (i.e., audit) of the components of the boot sequence. The stored PCR value is one example of an integrity metric. The PCR value(s) may thus be utilized to attest to the integrity of client device 102 including, e.g., OS 120. Such extend operations may be similarly utilized to provide an accumulation corresponding to portions of a data stream, as described herein.

In operation, client device 102, e.g., application 124, may be configured to acquire and/or generate data. The data may correspond to a stream of data, i.e., a data stream. The client device 102 may be configured to transmit the data stream to a server system, e.g., server system 104. For example, application 124 may be a sensor application configured to acquire sensor data from one or more sensors included in peripheral devices 116. For example, the sensors may be related to the IoT. The sensor data may be acquired continuously, periodically and/or intermittently. Application 124 may then be configured to provide the acquired sensor data to server system 104 via communication link 106. The acquired data may be stored temporarily in data store 122 and/or transmitted as acquired. A plurality of sensor readings may generally be combined into a data stream and transmitted to server system 104 via communication interface 112 and communication link 106.

In another example, application 124 may be configured to acquire user data from one or more user interfaces included in peripheral devices 116. Similar to the sensor data example, the acquired user data may be stored in data store 122 and/or transmitted as acquired. A data stream that includes user data may then be transmitted to server system 104 via communication interface 112 and communication link 106.

The data stream and/or one or more hash digest(s) of respective portions of a transmitted data stream may be provided to TPM 130. For example, attest logic 126 may be configured to generate each hash digest and provide each hash digest to TPM 130. Each hash digest may be provided to the TPM 130 using an extend command, i.e., as part of an extend operation. Secure controller 131 may be configured to manage and/or perform the extend operation.

Similar to the extend operations associated with booting the client device 102, extend operations associated with the data stream facilitate accumulating a secure hash value associated with the transmitted data. The extend operation includes concatenating a received hash value (or portion of the data stream) and a current PCR value (and/or a current extendable NV index value), performing a secure hash (e.g., SHA1 (a secure hash algorithm, as described herein)) operation on the current PCR value (or current extendable NV index value) concatenated with the received hash value (or received data stream portion) and storing the secure hash result to the PCR (or extendable NV index). In other words, the secure hash result becomes a new current PCR value (or a new current extendable NV index value). In one example (e.g., a resettable PCR or an extendable NV index), an initial PCR value or initial extendable NV index value may be set to zero. In another example (e.g., a non-resetting PCR), the initial PCR value may correspond to a PCR value associated with a prior operation, e.g., associated with a prior data stream. In this example, the PCR value associated with the prior data stream may be determined by requesting the current PCR value from the TPM 130. The accumulated hash digest (i.e., accumulated PCR value) may then correspond to successive secure hash digests of a respective current PCR value concatenated with a respective current received hash value (or respective current received data stream portion). Thus, one or more block(s) of data, i.e., a portion or all of a data stream, may be associated with one accumulated PCR value. Similar operations may be performed using an extendable NV index rather than a PCR. The extendable NV indexes may further be utilized in a quote operation, as described herein.

The current PCR value and/or extendable NV index value may be provided to the server system 104 periodically, e.g., based on an amount of data transmitted or based on a time interval, and/or in response to a request from a verifier, e.g., verifier logic, 150 of server system 104. The current PCR value and/or extendable NV index value may be provided to the server system 104 in a quote (e.g., a TPM quote). A TPM quote is a cryptographically signed PCR value and/or extendable NV index value, that has been signed by an AIK private key, e.g., key1 136, key2 138. An external challenge may be appended (i.e., concatenated) to the PCR value and/or extendable NV index value prior to signing. The external challenge is an anti-replay element that may include, but is not limited to, a nonce, a timestamp, or a monotonic counter value. The anti-replay element is configured to prevent replay attacks where an attacker sends a previously provided value. The quote may thus include a signed secure hash digest. The secure hash digest corresponds to an accumulation of secure hash digests related to one or more blocks (i.e., a plurality of portions) of the data stream.

An AIK may be utilized to attest to the identity of the device. For example, an AIK may be associated with a device identifier. The signature is related to the AIK private key included in TPM 130. Thus, a verifier, e.g., verifier logic 150, may verify both the integrity of a received data stream and the identity of the source of the data stream. In other words, proof of the integrity of the received data stream is supported by the hash operations inside the TPM and proof of the identity of the source is supported by signing the accumulated hash digest with the AIK private key. The AIK is associated with, i.e., represents, an identity of the client device.

In an embodiment, the AIK private key, e.g., key1 136, utilized to authenticate the client device 102 may be utilized to sign the PCR (or extendable NV index) value (and the anti-replay element). In another embodiment, a first AIK private key, e.g., key1 136, used to authenticate the client device 102, may be utilized to certify a second AIK private key, e.g., key2, 138. The second AIK, key2 138, may then be utilized to sign the PCR (or extendable NV index) value (and the anti-reply element). In a certify operation, a public key associated with key2 138 along with one or more attributes of key2 may be signed with key1 136. Attributes may include, but are not limited to, a type of cryptographic algorithm (e.g., RSA (Rivest-Shamir-Adleman), ECC (elliptic curve cryptography)), parameter size (e.g., 1024-bit, 2048-bit, etc. The certify operation is configured to prove that the first AIK private key, key1 136, and the second AIK private key, key2 138, are contained in the same TPM, e.g., TPM 130.

Utilizing the second AIK private key, key2 138, that has been certified by the first AIK private key key1 136, to sign each secure hash digest, e.g., PCR value, facilitates using the first AIK private key, key1 136, directly, only to prove an identity of client device 102. In some situations, the first AIK may be utilized to authenticate the client device to a first server and the second AIK may be utilized to authenticate the data stream to a second server. For example, for a client device that is a power meter, the identity of the power meter may be authenticated using the first AIK to a power company (i.e., a power provider) while detailed power usage data may be provided to a second entity. The second AIK may then be utilized by the second entity to determine that the power meter has been authenticated.

The server system 104 includes a processor 140, a communication interface 142, memory 144 and verifier logic 150. The server system 104 may include a key store 152. Processor 140 is configured to perform operations of server system 104. Communication interface 142 is configured to couple server system 104 to communication link 106 and client device 102.

The server system 104 is configured to store or have access to a respective AIK public key associated with each AIK key pair that may be used to authenticate the client device 102. For example, the server system 104 may receive an associated public key with the data stream. In another example, the server system 104 may maintain a database, e.g., key store 152, of public key and associated AIK identifier pairs. In other words, the AIK identifier may correspond to the AIK key pair that includes the public key and associated private key. The AIK identifier may further correspond to a hardware identifier associated with client device 102. In another example, the public key may be provided according to an interface compatible with a TNC (Trusted Network Connect) protocol, e.g., a metadata access point interface (IF-MAP) protocol that is configured to store state information about, e.g., client devices.

The server system 104, e.g., verifier logic 150, may then select the appropriate AIK public key based, at least in part, on the AIK identifier. In order to verify that a received data stream originated at the authenticated client device 102, the verifier logic 150 may be configured to compare the public key associated with the authentication of client device 102 with the public key associated with the received data stream. For example, a hash digest of each public key may be compared. If the comparison is successful, i.e., if the identity of the AIK used to authenticate the client device 102 corresponds to the identity of the AIK used to sign the received TPM quote, then the server system 104 may verify the anti-replay element. If the anti-replay element verifies, then the client device 102 may be confirmed as the source of the data associated with the TPM quote.

In some embodiments, the AIK private key, e.g., key1 136, used to authenticate the client device 102 may not be used to directly authenticate the data transmitted to server system 104. In these embodiments, key1 136 may be used to certify a second AIK private key, e.g., key2 138. Key2 138 may then be used to sign a secure hash digest, i.e., PCR value, associated with the transmitted data stream.

Certifying includes signing the second AIK public key and some other attributes of the second AIK public key with the first AIK private key, e.g. key1 136. Certification is configured to "prove" that the second AIK private key key2 138 is contained in the same TPM, e.g., TPM 130, as the first AIK private key1 136. In this embodiment, server system 104 may be configured to store a database, e.g., a lookup table, that relates the second AIK and the first AIK. For example, the lookup table may be stored to key store 152. For example, a first AIK identifier may be associated with a second AIK identifier. Thus, server system 104 may be enabled to identify client devices based, at least in part, on the first AIK identifier, and to associate the received data stream with client device 102 based, at least in part, on the received TPM quote, signed with the private key portion, e.g., key2 138, of the second AIK.

Thus, trust of a platform, i.e., client device 102, established with an attestation protocol may be extended to trust in the source and integrity of the received data. An AIK used in the attestation protocol may be used in a different protocol to directly sign the data or to certify a different AIK that may then be used to protect the data. Thus, received data may be trusted as being transmitted from the associated authenticated client device.

Figure 2:
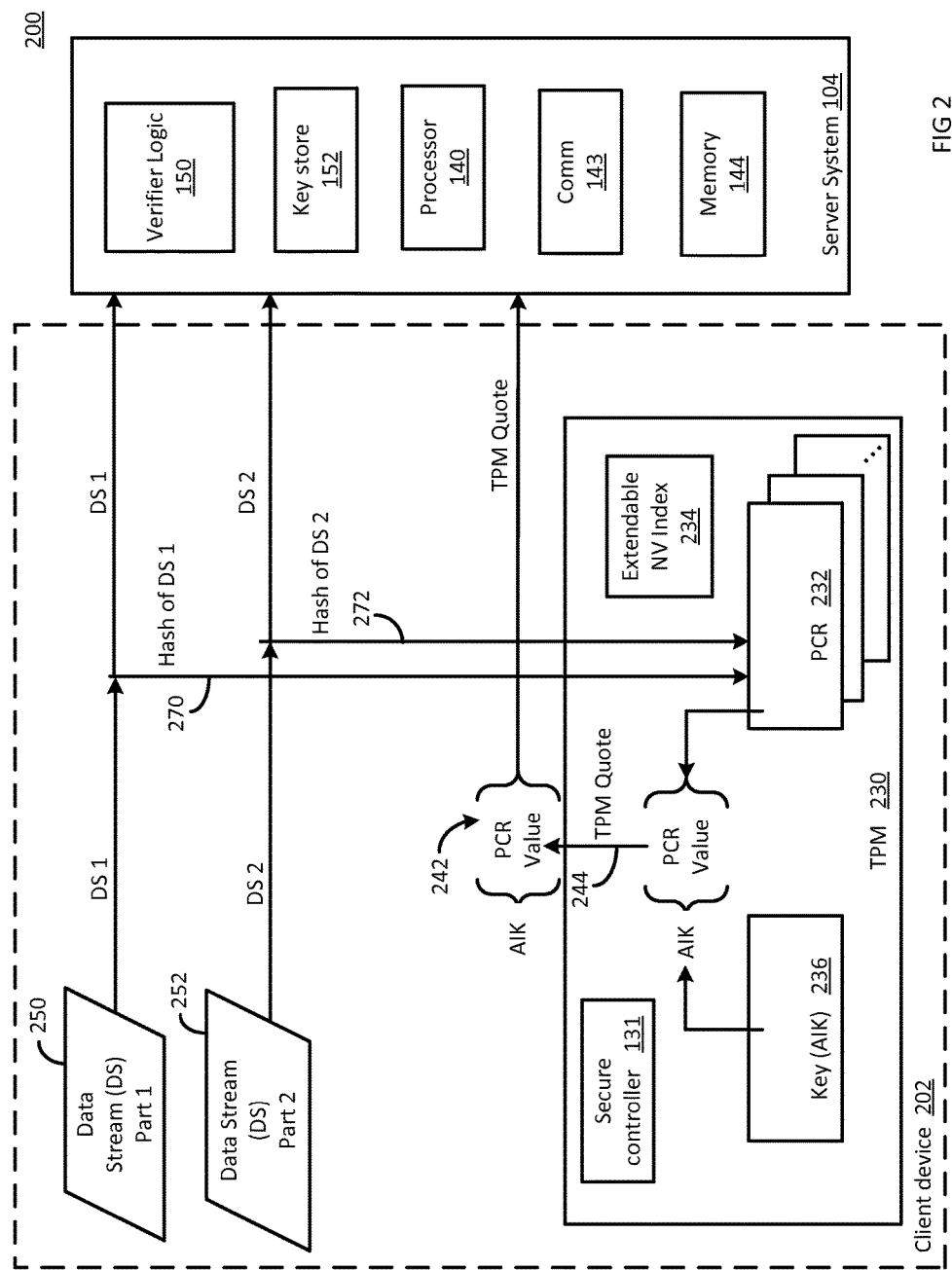
FIG. 2 illustrates one example of directly signing a secure hash digest associated with a data stream, consistent with one embodiment of the present disclosure.

FIG. 2 illustrates one example 200 of directly signing a secure hash digest associated with a data stream, consistent with one embodiment of the present disclosure. Example 200 includes client device 202 and server system 104. Client device 202 is one example of client device 102 of FIG. 1. Client device 202 includes TPM 230, one example of TPM 130 of FIG. 1. TPM 230 includes secure controller 131, a plurality of PCRs, e.g., PCR 232, and at least one AIK private key, e.g., key (AIK) 236, and may include one or more extendable NV indexes, e.g., extendable NV index 234. Key (AIK) 236 is configured to attest to the identity of a client device, e.g., client device 102 of FIG. 1, that contains TPM 230. In other words, prior to operations associated with the data stream portions DS1 250 and DS2 252, server system 104 has authenticated the identity of the client device 202 using key (AIK) 236 and the associated AIK public key.

Example 200 illustrates two portions of a data stream (DS), e.g., DS1 250 and DS2 252, that are transmitted to server system 204. For example, data stream first portion 250 and data stream second portion 252 may be transmitted from client device 202 to server system 204 via communication interface 112 and communication link 106 of FIG. 1. For example, each data stream portion, DS1 250 and DS2 252, may be provided to TPM 230. In another example, DS1 250 and DS2 252 may each be hashed to produce a respective hash digest 270, 272 and the corresponding hash digest 270, 272, may be provided to TPM 230. The hash digests 270, 272 may be provided to TPM 230 and PCR 232 using an extend operation, as described herein. Secure controller 131 may be configured to manage and/or perform operations associated with the extend operation. The hash digests 270, 272 may be provided to a same PCR, e.g., PCR 232, or to a plurality of PCRs, and/or extendable NV indexes, e.g., extendable NV index 234. For example, as illustrated in example 200, both hash digests 270, 272 are provided to one PCR, i.e., PCR 232. In this example, each hash digest 270, 272 may be sequentially concatenated to a current PCR value and a secure hash algorithm applied to produce a new PCR value. PCR 232 may thus contain a secure hash digest, e.g., PCR value 242. The PCR value 242 represents at least a portion of a data stream that includes DS1 250 and DS2 252.

Periodically and/or intermittently, the PCR value 242 may be signed using key (AIK) 236, thus, generating a TPM quote 244. The TPM quote 244 may exit the TPM 230 and may be transmitted to server system 104. For example, attest logic, e.g., attest logic 126 of FIG. 1, may be configured to request the TPM quote 244, e.g., in response to a request from verifier logic 150. Secure controller 131 may be configured to manage and/or perform operations associated with generating a TPM quote and associated with outputting the TPM quote 244. The TPM quote 244 may then be transmitted to server system 104 via, e.g., communication interface 112 and communication link 106.

Verifier logic 150 may be configured to verify an identity of TPM 230 and/or the client device 202 that contains TPM 230. Verifier logic 150 may verify the identity of TPM 230 based, at least in part, on a public key associated with key (AIK) 236, as described herein. For example, verifier logic 150 may be configured to verify that the AIK public key associated with the received TPM quote 244 corresponds to an authenticated client device, e.g., client device 202. Verifier logic 150 may be further configured to verify the integrity of the associated client device using one or more PCR values related to, e.g., boot sequence, as described herein. Verifier logic 150 may be further configured to verify the signature of the received TPM quote 244. For example, verifying the signature may include verifying that an anti-replay element is correct. Verifier logic 150 may then be configured to verify a hash digest of the received data. For example, the hash digest of the received data may be verified by hashing the received data stream and comparing the hash digest of the received data stream with the signed secure hash digest (i.e., TPM quote 244) received from the TPM 230. If the hash digests match, then the client device 202 may be confirmed as the source of the data stream portions, DS1 250 and DS2 252. Thus, example 200 illustrates directly signing the PCR value 242 to generate the PCM quote 244.

Thus, identity and integrity of a client device may be verified using an AIK key pair. Data received at a server system may then be authenticated by identifying and verifying the client device as the source of the data.

Figure 3:
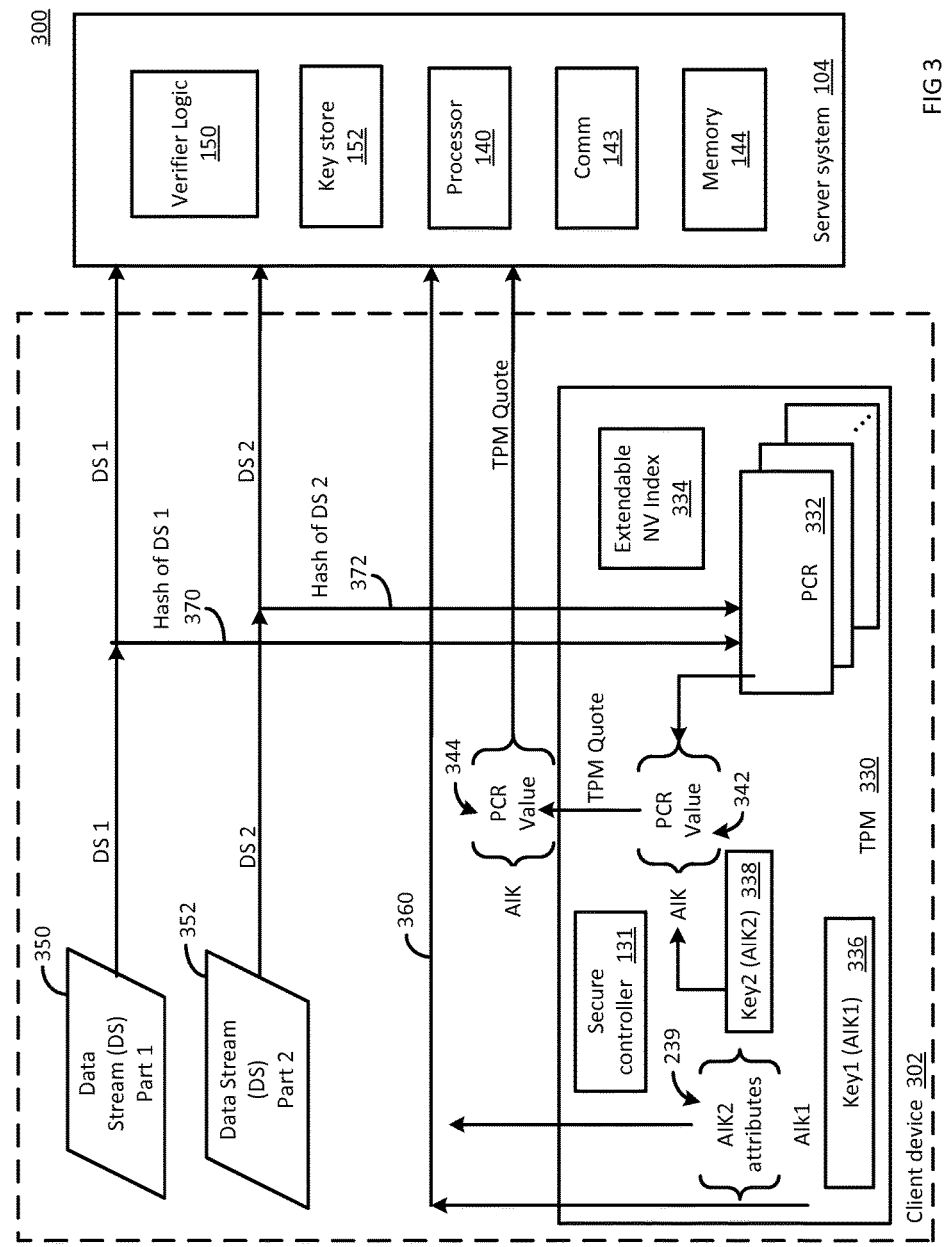
FIG. 3 illustrates one example of indirectly signing a secure hash digest associated with a data stream, consistent with one embodiment of the present disclosure.

FIG. 3 illustrates one example 300 of indirectly signing a secure hash digest associated with a data stream, consistent with one embodiment of the present disclosure. Example 300 includes client device 302 and server system 104. Client device 302 is one example of client device 102 of FIG. 1. Client device 302 includes TPM 330, one example of TPM 130 of FIG. 1. TPM 330 includes secure controller 131, a plurality of PCRs, e.g., PCR 332, and a plurality of AIK private keys, e.g., key1 (AIK1) 336 and key2 (AIK2) 238, and may include one or more extendable NV indexes, e.g., extendable NV index 334. Key1 (AIK1) 336 is configured to attest to the identity of a client device, e.g., client device 102 of FIG. 1, that contains TPM 330. In other words, prior to operations associated with the data stream portions DS1 350 and DS2 352, server system 104 has authenticated the identity of the client device 302 using key1 (AIK1) 336 and the associated AIK public key.

Example 300 illustrates two portions of a data stream (DS), e.g., DS1 350 and DS2 352 that are transmitted to server system 104. Each portion, DS1 350 and DS2 352, may be hashed to produce a respective hash digest, e.g., hash digests 370, 372, and the corresponding hash digest 370, 372 may be provided to PCR 332. The hash digests 370, 372 may be provided to TPM 330 and PCR 332 via an extend operation, as described herein. Secure controller 131 may be configured to manage and/or perform operations associated with the extend operation. The hash digests 370, 372 may be provided to a same PCR, e.g., PCR 332, or to a plurality of PCRs, and/or extendable NV indexes, e.g., extendable NV index 334. For example, as illustrated in example 300, both hash values are provided to one PCR, i.e., PCR 332. PCR 332 may thus contain a secure hash digest, e.g., PCR value 342. The PCR value 342 represents at least a portion of a data stream that includes DS1 350 and DS2 352. Periodically and/or intermittently, the PCR value 342 may be signed using key2 (AIK2) 338, thus, generating a TPM quote 344. The TPM quote 344 may exit the TPM 330 and may be transmitted to server system 304. Secure controller 131 may be configured to manage and/or perform operations associated with generating a TPM quote and associated with outputting the TPM quote 344. For example, attest logic, e.g., attest logic 126 of FIG. 1, may be configured to request the TPM quote 344, e.g., in response to a request from verifier logic 150. The TPM quote 344 may then be transmitted to server system 304 via, e.g., communication interface 112 and communication link 106.

In this example 300, TPM 330 may be configured to utilize key1 (AIK1) 336 to certify key2 (AIK2) 338. The certification is configured to prove that key2 (AIK2) 338 is contained in a same TPM, e.g., TPM 330, that contains key1 (AIK1) 336. The certified key2 (AIK2) 338 may then be utilized to perform a TPM quote operation on one or more PCR values, e.g., PCR value 342. Signing the PCR value 342 with the certified key2 (AIK2) 338 may then be equivalent (from a trust standpoint) to signing the PCR value 242 with key1 (AIK1) 336.

Verifier logic 150 may be configured to verify an identity of TPM 330 and/or the client device 302 that contains TPM 330. Verifier logic 150 may verify the identity of TPM 330 based, at least in part, on a public key associated with key1 (AIK1) 336. Verifier logic 150 may be configured to verify that the AIK2 public key associated with the received quote 344 corresponds to an authenticated client device, e.g., client device 302. For example, verifier logic 150 may be configured to query a lookup table that includes client device identifiers associated with certified AIK identifiers. The lookup table may be stored, for example, in key store 152. In other words, the lookup table may be configured to provide a mapping between AIK1 and AIK2. Verifier logic 150 may then identify client device 302 based, at least in part, on AIK2.

Verifier logic 150 may verify the signature of the received TPM quote 344. For example, verifying the signature may include verifying that an anti-replay element is correct. Verifier logic 150 may then be configured to verify a hash of the received data. For example, the hash of the received data may be verified by hashing the received data stream and comparing the hash of the received data stream with a signed hash received from the TPM 330. Thus, example 300 illustrates indirectly signing the PCR value 342 using a second AIK certified by the first AIK to generate the PCM quote 344.

Thus, identity and integrity of a client device may be verified using an AIK key pair. Data received at a server system may then be authenticated by identifying and verifying the client device as the source of the data.

Figure 4:
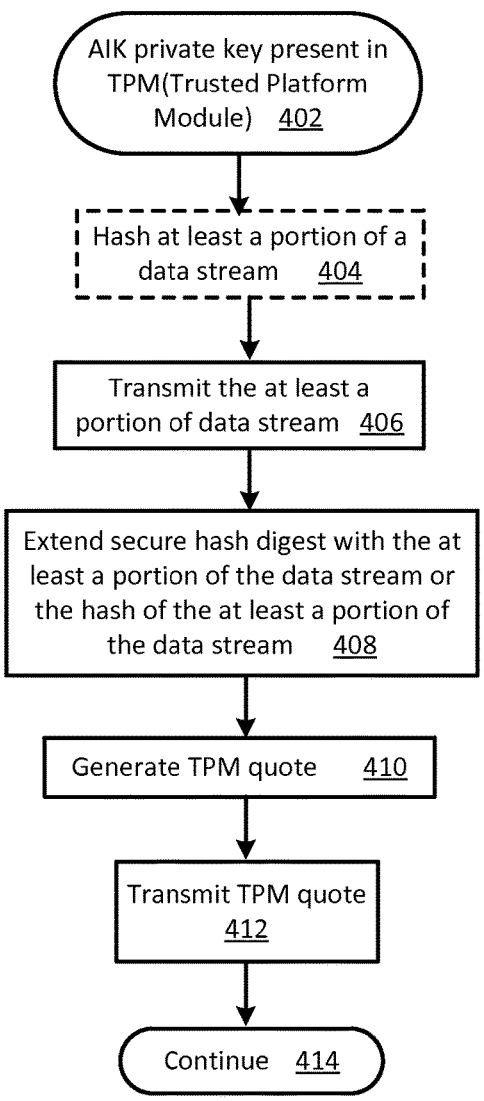
FIG. 4 is a flowchart of data protection operations according to various embodiments of the present disclosure.

FIG. 4 is a flowchart 400 of data protection operations according to various embodiments of the present disclosure. In particular, the flowchart 400 illustrates generating TPM quotes and transmitting data (e.g., a data stream) and corresponding TPM quotes to a server system. The operations may be performed, for example, by, e.g., client device 102, TPM 130 and/or secure controller 131 of FIG. 1.

Operations of this embodiment may begin with an AIK private key present in a trusted platform module (TPM) at operation 402. For example, the TPM may include one or more key slots configured to hold one or more AIK private keys. In some embodiments, at least a portion of a data stream may be hashed at operation 404. The at least a portion of the data stream may be transmitted at operation 406. For example, the at least a portion of the data stream may be transmitted from a client device to a server system. It should be noted that operation 404, if present, may be performed in parallel or reverse order with respect to operation 406. A secure hash digest may be extended with the at least a portion of the data stream or the hash of the at least a portion of the data stream at operation 408. For example, the at least a portion of the data stream or the hash of the at least a portion of the data stream may be provided to a PCR or an extendable NV index in an extend operation, as described herein. A TPM quote may be generated at operation 410 utilizing the AIK private key. For example, generating the TPM quote may include signing the PCR value and an anti-replay element. The TPM quote may be transmitted at operation 412. For example, the TPM quote may be transmitted to the server system. Program flow may continue at operation 414.

Thus, flowchart 400 illustrates generating TPM quotes and transmitting data and corresponding TPM quotes to a server system.

Figure 5:
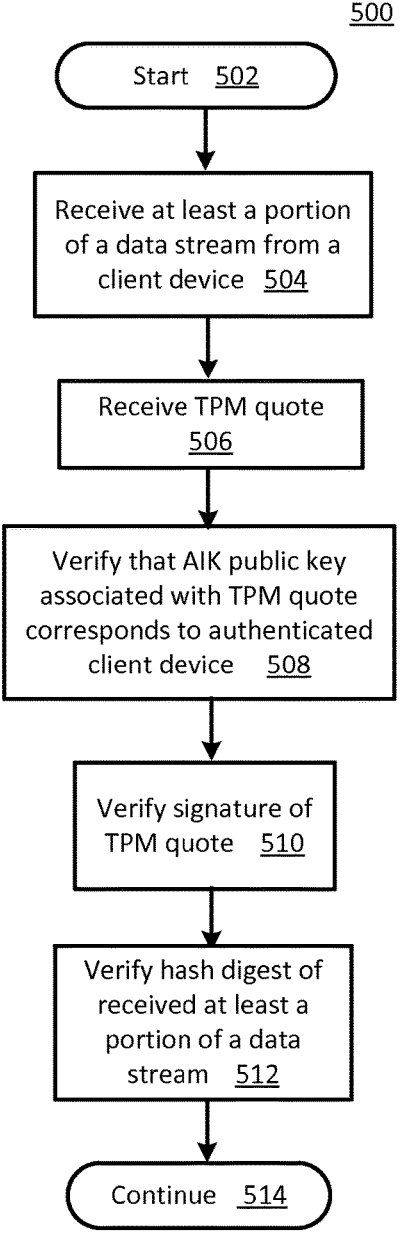
FIG. 5 is another flowchart of data protection operations according to various embodiments of the present disclosure.

FIG. 5 is a flowchart 500 of data protection operations according to various embodiments of the present disclosure. In particular, the flowchart 500 illustrates verifying received data. The operations may be performed, for example, by, e.g., server system 104 of FIG. 1.

Operations of this embodiment may begin with start at operation 502. At least a portion of a data stream may be received from a client device at operation 504. A corresponding TPM quote may be received at operation 506. For example, the at least a portion of the data stream may be transmitted from a client device to the server system. It should be noted that operations 504 and 506 may occur in parallel or reverse order. Operation 508 includes verifying that an AIK public key associated with the TPM quote corresponds to the authenticated client device. For example, whether the AIK public key corresponds to the authenticated client device may be determined. In other words, whether a device identifier associated with the AIK public key corresponds to the authenticated client device may be determined. A signature of a TPM quote may be verified at operation 510. For example, verifying the signature may include determining whether an associated anti-replay element is correct. A hash of received data may be verified at operation 512. For example, the hash of the received data may be verified by comparing a hash digest of the received data to the PCR value associated with the received TPM quote. Program flow may continue at operation 514.

Thus, received data may be verified as being transmitted by an authenticated client device.

While the flowcharts of FIGS. 4 and 5 illustrate operations according various embodiments, it is to be understood that not all of the operations depicted in FIGS. 4 and 5 are necessary for other embodiments. In addition, it is fully contemplated herein that in other embodiments of the present disclosure, the operations depicted in FIGS. 4 and/or 5 and/or other operations described herein may be combined in a manner not specifically shown in any of the drawings, and such embodiments may include less or more operations than are illustrated in FIGS. 4 and 5. Thus, claims directed to features and/or operations that are not exactly shown in one drawing are deemed within the scope and content of the present disclosure.

Thus, an apparatus, method and/or system are configured to facilitate verification by a receiver, e.g., a server system, that a source of received data is an authenticated client device An AIK private key associated with the authenticated client device may be utilized to sign a platform configuration register (PCR) value, i.e., a secure hash digest, associated with the data stream. Signing a PCR value with an AIK private key corresponds to performing a quote operation. The secure hash digest may be stored in a PCR or extendable NV (nonvolatile) index contained in the TPM. The AIK private key may be utilized directly to sign the hash digest or indirectly to certify a second key (i.e., a second AIK private key) and the second key may then be utilized to sign the secure hash digest, i.e., PCR value or extendable NV index value.

Thus, consistent with the present disclosure, a client device may be configured to accumulate at least a portion of a data stream, perform a quote operation on the at least a portion of the data stream or a hash digest of the at least a portion of the data stream and to provide the at least a portion of the data stream and the quote to a server system. The server system may then be configured to confirm an identity of the source of the received data stream. Thus, the server system may be able to confirm that the sending device is authenticated and that the received data came from the authenticated sending device.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

The foregoing provides example system architectures and methodologies, however, modifications to the present disclosure are possible. The processor may include one or more processor cores and may be configured to execute system software. System software may include, for example, an operating system. Device memory may include I/O memory buffers configured to store one or more data packets that are to be transmitted by, or received by, a network interface.

The operating system (OS) may be configured to manage system resources and control tasks that are run on, e.g., client device 102 and/or server system 104. For example, the OS may be implemented using Microsoft® Windows®, HP-UX®, Linux®, or UNIX®, although other operating systems may be used. In another example, the OS may be implemented using Android™, iOS, Windows Phone® or BlackBerry®. In some embodiments, the OS may be replaced by a virtual machine monitor (or hypervisor) which may provide a layer of abstraction for underlying hardware to various operating systems (virtual machines) running on one or more processing units.

Client device 102, 202, 302, TPM module 130, 230, 330 and/or server system 104 may comply and/or be compatible with one or more trusted platform module (TPM) specifications. For example, client device 102, 202, 302, TPM module 130, 230, 330 and/or server system 104 may comply and/or be compatible with TCG (Trusted Computing Group) specification title: TPM Main, Part 1, Design Principles, version 1.2, revision 116, published Mar. 1, 2011, by the TCG, and/or later and/or related versions of this standard.

In another example, client device 102, 202, 302, TPM module 130, 230, 330 and/or server system 104 may comply and/or be compatible with one or more of TCG specifications title: Trusted Platform Module Library, Part 1: Architecture by the TCG, Family "2.0", Level 00, revision 01.16, published Oct. 30, 2014, and/or later and/or related versions of this standard, for example, Part 2 (Structures), Part 3 (Commands) and Part 4 (Supported Routines) of the aforementioned Trusted Platform Module Library.

Client device 102, 202, 302, TPM module 130, 230, 330 and/or server system 104 may comply and/or be compatible with one or more trusted network connect (TNC) specifications. For example, client device 102, 202, 302, TPM module 130, 230, 330 and/or server system 104 may comply and/or be compatible with TCG Trusted Network Connect specification title: TNC Architecture for Interoperability, version 1.5, revision 3, published May 7, 2012, by the TCG, and/or later and/or related versions of this standard.

TPM module 130, 230, 330 and/or server system 104 may comply and/or be compatible with FIPS Publication 180-4, titled: "Secure Hash Standard (SHS)", published by NIST in March 2012, and/or later and/or related versions of this standard.

Client device 102, 202, 302, server system 104 and communication link 106 may comply and/or be compatible with one or more communication specifications, standards and/or protocols.

For example, client device 102, 202, 302, server system 104 and communication link 106 may comply and/or be compatible with an IPv6 (Internet Protocol version 6) over Low Power Wireless Personal Area Networks (6LoWPAN) standard: RFC (Request for Comments) 6282, titled Compression Format for IPv6 Datagrams over IEEE 802.15.4-Based Networks, published by the Internet Engineering Task Force (IETF), September 2011, and/or later and/or related versions of this standard.

In another example, client device 102, 202, 302, server system 104 and communication link 106 may comply and/or be compatible with IEEE (Institute of Electrical and Electronics Engineers) 802.15.4-2006 standard titled: IEEE Standard for Information technology—Telecommunications and information exchange between systems—Local and metropolitan area networks—Specific requirements Part 15.4: Wireless Medium Access Control (MAC) and Physical Layer (PHY) Specifications for Low Rate Wireless Personal Area Networks (LR-WPANS), published in 2006 and/or later and/or related versions of this standard.

In another example, client device 102, 202, 302, server system 104 and communication link 106 may comply and/or be compatible with a ZigBee specification and/or standard, published and/or released by the ZigBee Alliance, Inc., including, but not limited to, ZigBee 3.0, draft released November 2014, ZigBee RF4CE, ZigBee IP, and/or ZigBee PRO published in 2012, and/or later and/or related versions of these standards.

In another example, client device 102, 202, 302, server system 104 and communication link 106 may comply and/or be compatible with IEEE Std 802.11™-2012 standard titled: IEEE Standard for Information technology—Telecommunications and information exchange between systems—Local and metropolitan area networks—Specific requirements Part 11: Wireless LAN Medium Access Control (MAC) and Physical Layer (PHY) Specifications, published in March 2012 and/or earlier and/or later and/or related versions of this standard, including, for example, IEEE Std 802.11Ac™-2013, titled IEEE Standard for Information technology-Telecommunications and information exchange between systems, Local and metropolitan area networks-Specific requirements, Part 11: Wireless LAN Medium Access Control (MAC) and Physical Layer (PHY) Specifications; Amendment 5: Enhancements for Very High Throughput for Operation in Bands below 6 GHz, published by the IEEE, December 2013.

In another example, client device 102, 202, 302, server system 104 and communication link 106 may comply and/or be compatible with IEEE Std 802.3™-2012 standard titled: IEEE Standard for Ethernet, including Sections 1 through 6, published in December 2012 and/or earlier (e.g., IEEE Std 802.3-2008) and/or later and/or related versions of this standard.

In another example, client device 102, 202, 302, server system 104 and communication link 106 may comply and/or be compatible with Internet Engineering Task Force (IETF) Request for Comments (RFC) RFC 791, titled: Internet Protocol, DARPA Internet Program Protocol Specification, published September 1981, known as "IPv4", and/or RFC 2460, titled: Internet Protocol, Version 6 (IPv6), known as "IPv", and/or later and/or related versions of these specifications.

For example, client device 102, 202, 302, server system 104 and communication link 106 may comply and/or be compatible with one or more third generation (3G) telecommunication standards, recommendations and/or protocols that may comply and/or be compatible with International Telecommunication Union (ITU) Improved Mobile Telephone Communications (IMT)-2000 family of standards released beginning in 1992, and/or later and/or related releases of these standards. For example, client device(s) 102a, . . . , 102n, service provider server 106, other service provider 107 and/or network(s) 104a and/or 104b may comply and/or be compatible with one or more CDMA (Code Division Multiple Access) 2000 standard(s) and/or later and/or related versions of these standards including, for example, CDMA2000 1×RTT, 1× Advanced and/or CDMA2000 1×EV-DO (Evolution-Data Optimized): Release 0, Revision A, Revision B, Ultra Mobile Broadband (UMB). In another example, client device(s) 102a, . . . , 102n, service provider server 106, other service provider 107 and/or network(s) 104a and/or 104b may comply and/or be compatible with UMTS (Universal Mobile Telecommunication System) standard and/or later and/or related versions of these standards.

Client device 102, 202, 302, server system 104 and communication link 106 may comply and/or be compatible with one or more fourth generation (4G) telecommunication standards, recommendations and/or protocols that may comply and/or be compatible with ITU IMT-Advanced family of standards released beginning in March 2008, and/or later and/or related releases of these standards. For example, client device(s) 102a, . . . , 102n, service provider server 106, other service provider 107 and/or network(s) 104a and/or 104b may comply and/or be compatible with IEEE standard: IEEE Std 802.16™-2012, title: IEEE Standard for Air Interface for Broadband Wireless Access Systems, released August 2012, and/or related and/or later versions of this standard. In another example, client device(s) 102a, . . . , 102n, service provider server 106, other service provider 107 and/or network(s) 104a and/or 104b may comply and/or be compatible with Long Term Evolution (LTE), Release 8, released March 2011, by the Third Generation Partnership Project (3GPP) and/or later and/or related versions of these standards, specifications and releases, for example, LTE-Advanced, Release 10, released April 2011.

Memory 114, 144 may each include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 5.0 of VHDL-2008 and/or other versions of the IEEE VHDL standards and/or other hardware description standards.

Thus, consistent with the present disclosure, a client device may be configured to accumulate at least a portion of a data stream, perform a quote operation on the at least a portion of the data stream or a hash digest of the at least a portion of the data stream and to provide the at least a portion of the data stream and the quote to a server system. The server system may then be configured to confirm an identity of the source of the received data stream. Thus, the server system may be able to confirm that the sending device is authenticated and that the received data came from the authenticated sending device.

EXAMPLES

Examples of the present disclosure include subject material such as a method, means for performing acts of the method, a device, or of an apparatus or system related to data protection keys, as discussed below.

Example 1

According to this example, there is provided a client device. The client device includes a Trusted Platform Module (TPM). The TPM includes a secure controller to extend a secure hash digest with at least a portion of a data stream or a hash of the at least a portion of the data stream.

Example 2

This example includes the elements of example 1, wherein the extending includes concatenating the secure hash digest with the at least a portion of the data stream or the hash of the at least a portion of the data stream, performing a secure hash operation, and storing a result of the secure hash operation to a platform configuration register (PCR) or an extendable NV (nonvolatile) index contained in the TPM.

Example 3

This example includes the elements of example 1, wherein the secure controller is further to generate a Trusted Platform Module (TPM) quote.

Example 4

This example includes the elements of example 3, wherein the TPM quote is generated using an attestation identity key (AIK) private key, the AIK private key related to an identity of the client device.

Example 5

This example includes the elements according to any one of examples 1 through 3, wherein the secure hash digest corresponds to an accumulation of a plurality of secure hash digests related to a plurality of portions of the data stream.

Example 6

This example includes the elements according to any one of examples 1 through 3, wherein the TPM includes a platform configuration register (PCR), the secure hash digest stored in the PCR.

Example 7

This example includes the elements according to any one of examples 1 through 3, wherein the TPM includes an extendable NV (nonvolatile) index, the secure hash digest stored in the extendable NV index.

Example 8

This example includes the elements according to any one of examples 1 through 3, further including a peripheral device, the peripheral device to acquire the data stream.

Example 9

This example includes the elements of example 8, wherein the peripheral device is a sensor and the data stream includes sensor data.

Example 10

This example includes the elements of example 8, wherein the peripheral device is a user interface and the data stream includes user data.

Example 11

This example includes the elements according to any one of examples 1 through 3, wherein the TPM includes at least one key slot, each key slot to store a respective attestation identity key (AIK) private key.

Example 12

This example includes the elements of example 11, wherein the TPM includes a plurality of key slots that store the plurality of AIK private keys.

Example 13

This example includes the elements of example 12, wherein a first AIK private key is used to authenticate the client device and to certify a second AIK.

Example 14

This example includes the elements of example 4, wherein the AIK private key corresponds to a second AIK, a first AIK used to authenticate the client device.

Example 15

This example includes the elements of example 14, wherein the second AIK is certified by a first AIK private key.

Example 16

This example includes the elements of example 15, wherein the certifying includes signing the second AIK public key and an attribute of the second AIK public key.

Example 17

This example includes the elements according to any one of examples 1 through 3, further including a communication interface, the communication interface to transmit the at least a portion of the data stream to a server system.

Example 18

This example includes the elements of example 17, wherein the communication interface is further to transmit a TPM quote to the server system.

Example 19

This example includes the elements of example 18, wherein the TPM quote is transmitted at least one of periodically and/or in response to a request from the server system.

Example 20

This example includes the elements of example 19, wherein the TPM quote is transmitted periodically based on an amount of data transmitted or based on a time interval.

Example 21

This example includes the elements of example 3, wherein the TPM quote includes the secure hash digest and an appended anti-replay element.

Example 22

This example includes the elements of example 21, wherein the anti-replay element is selected from the group including a nonce, a timestamp and a monotonic counter value.

Example 23

This example includes the elements of example 4, wherein the AIK is used to authenticate the client device.

Example 24

This example includes the elements according to any one of examples 1 through 3, wherein the secure hash digest corresponds to an accumulation of a plurality of secure hash digests related to a respective plurality of portions of each of a plurality of data streams.

Example 25

This example includes the elements according to any one of examples 1 through 3, wherein the TPM includes a plurality of platform control registers (PCRs), the secure hash digest stored in one PCR of the plurality of PCRs.

Example 26

This example includes the elements of example 25, wherein the TPM further includes an extendable NV (nonvolatile) index.

Example 27

This example includes the elements of example 25, wherein at least one of the plurality of PCRs is restricted to use by the TPM to support monitoring one or more integrity metrics.

Example 28

This example includes the elements of example 26, wherein the extendable NV index is allocated one or more selected security and/or functional properties.

Example 29

This example includes the elements of example 27, wherein one of the at least one restricted PCRs stores a secure representation of one or more components included in a client device boot sequence.

Example 30

This example includes the elements according to any one of examples 1 through 3, further including attest logic to hash the at least a portion of the data stream, the secure controller to extend the secure hash digest with the hash of the at least a portion of the data stream.

Example 31

According to this example, there is provided a server system. The server system includes verifier logic to verify that an attestation identity key (AIK) public key associated with a received Trusted Platform Module (TPM) quote corresponds to an authenticated client device.

Example 32

This example includes the elements of example 31, wherein the verifier logic is further to verify a signature of the TPM quote.

Example 33

This example includes the elements of example 31, wherein the verifier logic is further to verify a secure hash digest associated with the TPM quote.

Example 34

This example includes the elements according to any one of examples 31 through 33, wherein the TPM quote corresponds to an accumulation of a plurality of hash digests related to a plurality of portions of a received data stream.

Example 35

This example includes the elements of example 32, wherein verifying the signature includes determining whether an anti-replay element is correct.

Example 36

This example includes the elements according to any one of examples 31 through 33, wherein the TPM quote is received from one client device of a plurality of client devices.

Example 37

This example includes the elements of example 36, wherein the TPM quote is related to at least a portion of a data stream received from the one client device.

Example 38

This example includes the elements of example 37, wherein the at least a portion of the data stream includes sensor data.

Example 39

This example includes the elements of example 37, wherein the at least a portion of the data stream includes user data.

Example 40

This example includes the elements of example 35, wherein the anti-replay element is selected from the group including a nonce, a timestamp and a monotonic counter value.

Example 41

This example includes the elements according to any one of examples 31 through 33, wherein the TPM quote is received in response to a request from verifier logic.

Example 42

This example includes the elements according to any one of examples 31 through 33, wherein the AIK public key is received with a data stream from one client device of a plurality of client devices.

Example 43

This example includes the elements according to any one of examples 31 through 33, further including a key store that stores the AIK public key and an associated AIK identifier.

Example 44

This example includes the elements according to any one of examples 31 through 33, wherein the AIK public key is retrieved from a metadata access point interface.

Example 45

This example includes the elements according to any one of examples 31 through 33, wherein verifying that the AIK public key corresponds to the authenticated client device includes determining whether the AIK public key corresponds to at least one of an AIK identifier and/or a hardware identifier associated with the authenticated client device.

Example 46

This example includes the elements according to any one of examples 31 through 33, wherein the AIK public key is a second AIK public key, the authenticated client device authenticated using a first AIK public key.

Example 47

This example includes the elements of example 46, wherein the verifying that the AIK public key corresponds to the authenticated client device includes determining whether the second AIK public key has been certified by the first AIK public key.

Example 48

This example includes the elements of example 47, wherein the determining includes determining whether the second AIK public key is related to the first AIK public key.

Example 49

This example includes the elements according to any one of examples 31 through 33, wherein the verifying that the AIK public key associated with the received TPM quote corresponds to the authenticated client device includes comparing the AIK public key associated with the received TPM quote with an AIK public key associated with the authentication of the authenticated client device.

Example 50

This example includes the elements of example 49, wherein the comparing includes comparing respective hashes of the AIK public keys.

Example 51

According to this example, there is provided a method. The method includes extending, by a secure controller, a secure hash digest with at least a portion of a data stream or a hash of the at least a portion of the data stream.

Example 52

This example includes the elements of example 51, wherein the extending includes concatenating the secure hash digest with the at least a portion of the data stream or the hash of the at least a portion of the data stream, performing a secure hash operation, and storing a result of the secure hash operation to a platform configuration register (PCR) or an extendable NV (nonvolatile) index contained in a Trusted Platform Module.

Example 53

This example includes the elements of example 51, further including generating, by the secure controller, a TPM quote.

Example 54

This example includes the elements of example 53, wherein the TPM quote is generated using an attestation identity key (AIK) private key, the AIK private key related to an identity of an associated client device.

Example 55

This example includes the elements of example 51, wherein the secure hash digest corresponds to an accumulation of a plurality of secure hash digests related to a plurality of portions of the data stream.

Example 56

This example includes the elements of example 51, wherein the secure hash digest is stored in a platform configuration register (PCR).

Example 57

This example includes the elements of example 51, wherein the secure hash digest is stored in an extendable NV (nonvolatile) index.

Example 58

This example includes the elements of example 51, further including acquiring, by a peripheral device, the peripheral data stream.

Example 59

This example includes the elements of example 58, wherein the peripheral device is a sensor and the data stream includes sensor data.

Example 60

This example includes the elements of example 58, wherein the peripheral device is a user interface and the data stream includes user data.

Example 61

This example includes the elements of example 51, further including storing, by each of at least one key slot, a respective attestation identity key (AIK) private key.

Example 62

This example includes the elements of example 61, including storing, by a plurality of key slots, the plurality of AIK private keys.

Example 63

This example includes the elements of example 62, wherein a first AIK private key is used to authenticate a client device and to certify a second AIK.

Example 64

This example includes the elements of example 54, wherein the AIK private key corresponds to a second AIK, a first AIK used to authenticate a client device.

Example 65

This example includes the elements of example 64, wherein the second AIK is certified by a first AIK private key.

Example 66

This example includes the elements of example 65, wherein the certifying includes signing, by the secure controller, the second AIK public key and an attribute of the second AIK public key.

Example 67

This example includes the elements of example 51, further including transmitting, by a communication interface, the at least a portion of the data stream to a server system.

Example 68

This example includes the elements of example 67, further including transmitting, by the communication interface, a TPM quote to the server system.

Example 69

This example includes the elements of example 68, wherein the TPM quote is transmitted at least one of periodically and/or in response to a request from the server system.

Example 70

This example includes the elements of example 69, wherein the TPM quote is transmitted periodically based on an amount of data transmitted or based on a time interval.

Example 71

This example includes the elements of example 53, wherein the TPM quote includes the secure hash digest and an appended anti-replay element.

Example 72

This example includes the elements of example 71, wherein the anti-replay element is selected from the group including a nonce, a timestamp and a monotonic counter value.

Example 73

This example includes the elements of example 54, wherein the AIK is used to authenticate the client device.

Example 74

This example includes the elements of example 51, wherein the secure hash digest corresponds to an accumulation of a plurality of secure hash digests related to a respective plurality of portions of each of a plurality of data streams.

Example 75

This example includes the elements of example 51, wherein the secure hash digest is stored in one platform control register (PCR) of a plurality of PCRs contained in a Trusted Platform Module (TPM).

Example 76

This example includes the elements of example 75, wherein the TPM further includes an extendable NV (nonvolatile) index.

Example 77

This example includes the elements of example 75, wherein at least one of the plurality of PCRs is restricted to use by the TPM to support monitoring one or more integrity metrics.

Example 78

This example includes the elements of example 76, wherein the extendable NV index is allocated one or more selected security and/or functional properties.

Example 79

This example includes the elements of example 77, further including storing, by one of the at least one restricted PCRs, a secure representation of one or more components included in a client device boot sequence.

Example 80

This example includes the elements of example 51, further including hashing, by attest logic, the at least a portion of the data stream, and extending, by the secure controller, the secure hash digest with the hash of the at least a portion of the data stream.

Example 81

According to this example, there is provided a method. The method includes verifying, by verifier logic, that an attestation identity key (AIK) public key associated with a received Trusted Platform Module (TPM) quote corresponds to an authenticated client device.

Example 82

This example includes the elements of example 81, further including, verifying, by the verifier logic, a signature of the TPM quote.

Example 83

This example includes the elements of example 81, further including, verifying, by the verifier logic, a secure hash digest associated with the TPM quote.

Example 84

This example includes the elements of example 81, wherein the TPM quote corresponds to an accumulation of a plurality of secure hash digests related to a plurality of portions of a received data stream.

Example 85

This example includes the elements of example 82, wherein verifying the signature includes determining whether an anti-replay element is correct.

Example 86

This example includes the elements of example 81, wherein the TPM quote is received from one client device of a plurality of client devices.

Example 87

This example includes the elements of example 86, wherein the TPM quote is related to at least a portion of a data stream received from the one client device.

Example 88

This example includes the elements of example 87, wherein the at least a portion of the data stream includes sensor data.

Example 89

This example includes the elements of example 87, wherein the at least a portion of the data stream includes user data.

Example 90

This example includes the elements of example 85, wherein the anti-replay element is selected from the group including a nonce, a timestamp and a monotonic counter value.

Example 91

This example includes the elements of example 81, further including requesting, by the verifier logic, the TPM quote, the TPM quote received in response to the request.

Example 92

This example includes the elements of example 81, wherein the AIK public key is received with a data stream from one client device of a plurality of client devices.

Example 93

This example includes the elements of example 81, further including storing, by a key store, the AIK public key and an associated AIK identifier.

Example 94

This example includes the elements of example 81, further including retrieving, by the verifier logic, the AIK public key from a metadata access point interface.

Example 95

This example includes the elements of example 81, wherein verifying that the AIK public key corresponds to the authenticated client device includes determining, by the verifier logic, whether the AIK public key corresponds to at least one of an AIK identifier and/or a hardware identifier associated with the authenticated client device.

Example 96

This example includes the elements of example 81, wherein the AIK public key is a second AIK public key, the authenticated client device authenticated using a first AIK public key.

Example 97

This example includes the elements of example 96, wherein the verifying that the AIK public key corresponds to the authenticated client device includes determining, by the verifier logic, whether the second AIK public key has been certified by the first AIK public key.

Example 98

This example includes the elements of example 97, wherein the determining includes determining, by the verifier logic, whether the second AIK public key is related to the first AIK public key.

Example 99

This example includes the elements of example 81, wherein the verifying that the AIK public key associated with the received TPM quote corresponds to the authenticated client device includes comparing, by the verifier logic, the AIK public key associated with the received TPM quote with an AIK public key associated with the authentication of the authenticated client device.

Example 100

This example includes the elements of example 99, wherein the comparing includes comparing, by the verifier logic, respective hashes of the AIK public keys.

Example 101

According to this example, there is provided a computer readable storage device having stored thereon instructions that when executed by one or more processors result in the following operations including extending a secure hash digest with at least a portion of a data stream or a hash of the at least a portion of the data stream.

Example 102

This example includes the elements of example 101, wherein the extending includes concatenating the secure hash digest with the at least a portion of the data stream or the hash of the at least a portion of the data stream, performing a secure hash operation, and storing a result of the secure hash operation to a platform configuration register (PCR) or an extendable NV (nonvolatile) index contained in a Trusted Platform Module.

Example 103

This example includes the elements of example 101, wherein the instructions that when executed by one or more processors results in the following additional operations including generating a TPM quote.

Example 104

This example includes the elements of example 103, wherein the TPM quote is generated using an attestation identity key (AIK) private key, the AIK private key related to an identity of an associated client device.

Example 105

This example includes the elements according to any one of examples 101 through 103, wherein the secure hash digest corresponds to an accumulation of a plurality of secure hash digests related to a plurality of portions of the data stream.

Example 106

This example includes the elements according to any one of examples 101 through 103, wherein the secure hash digest is stored in a platform configuration register (PCR).

Example 107

This example includes the elements according to any one of examples 101 through 103, wherein the secure hash digest is stored in an extendable NV (nonvolatile) index.

Example 108

This example includes the elements according to any one of examples 101 through 103, wherein the instructions that when executed by one or more processors results in the following additional operations including acquiring the peripheral data stream.

Example 109

This example includes the elements of example 108, wherein the peripheral device is a sensor and the data stream includes sensor data.

Example 110

This example includes the elements of example 108, wherein the peripheral device is a user interface and the data stream includes user data.

Example 111

This example includes the elements according to any one of examples 101 through 103, wherein the instructions that when executed by one or more processors results in the following additional operations including storing a respective attestation identity key (AIK) private key.

Example 112

This example includes the elements of example 111, wherein the instructions that when executed by one or more processors results in the following additional operations including storing the plurality of AIK private keys.

Example 113

This example includes the elements of example 112, wherein a first AIK private key is used to authenticate a client device and to certify a second AIK.

Example 114

This example includes the elements of example 104, wherein the AIK private key corresponds to a second AIK, a first AIK used to authenticate a client device.

Example 115

This example includes the elements of example 114, wherein the second AIK is certified by a first AIK private key.

Example 116

This example includes the elements of example 115, wherein the certifying includes signing the second AIK public key and an attribute of the second AIK public key.

Example 117

This example includes the elements according to any one of examples 101 through 103, wherein the instructions that when executed by one or more processors results in the following additional operations including transmitting the at least a portion of the data stream to a server system.

Example 118

This example includes the elements of example 117, wherein the instructions that when executed by one or more processors results in the following additional operations including transmitting a TPM quote to the server system.

Example 119

This example includes the elements of example 118, wherein the TPM quote is transmitted at least one of periodically and/or in response to a request from the server system.

Example 120

This example includes the elements of example 119, wherein the TPM quote is transmitted periodically based on an amount of data transmitted or based on a time interval.

Example 121

This example includes the elements of example 103, wherein the TPM quote includes the secure hash digest and an appended anti-replay element.

Example 122

This example includes the elements of example 121, wherein the anti-replay element is selected from the group including a nonce, a timestamp and a monotonic counter value.

Example 123

This example includes the elements of example 104, wherein the AIK is used to authenticate the client device.

Example 124

This example includes the elements according to any one of examples 101 through 103, wherein the secure hash digest corresponds to an accumulation of a plurality of secure hash digests related to a respective plurality of portions of each of a plurality of data streams.

Example 125

This example includes the elements according to any one of examples 101 through 103, wherein the secure hash digest is stored in one platform control register (PCR) of a plurality of PCRs contained in a Trusted Platform Module (TPM).

Example 126

This example includes the elements of example 125, wherein the TPM further includes an extendable NV (non-volatile) index.

Example 127

This example includes the elements of example 125, wherein at least one of the plurality of PCRs is restricted to use by the TPM to support monitoring one or more integrity metrics.

Example 128

This example includes the elements of example 126, wherein the extendable NV index is allocated one or more selected security and/or functional properties.

Example 129

This example includes the elements of example 127, wherein the instructions that when executed by one or more processors results in the following additional operations including storing a secure representation of one or more components included in a client device boot sequence.

Example 130

This example includes the elements according to any one of examples 101 through 103, wherein the instructions that when executed by one or more processors results in the following additional operations including hashing the at least a portion of the data stream, and extending, by the secure controller, the secure hash digest with the hash of the at least a portion of the data stream.

Example 131

According to this example, there is provided a computer readable storage device having stored thereon instructions that when executed by one or more processors results in the following operations including verifying that an attestation identity key (AIK) public key associated with a received Trusted Platform Module (TPM) quote corresponds to an authenticated client device.

Example 132

This example includes the elements of example 131, wherein the instructions that when executed by one or more processors results in the following additional operations including verifying a signature of the TPM quote.

Example 133

This example includes the elements of example 131, wherein the instructions that when executed by one or more processors results in the following additional operations including verifying a secure hash digest associated with the TPM quote.

Example 134

This example includes the elements according to any one of examples 131 through 133, wherein the TPM quote corresponds to an accumulation of a plurality of secure hash digests related to a plurality of portions of a received data stream.

Example 135

This example includes the elements of example 132, wherein verifying the signature includes determining whether an anti-replay element is correct.

Example 136

This example includes the elements according to any one of examples 131 through 133, wherein the TPM quote is received from one client device of a plurality of client devices.

Example 137

This example includes the elements of example 136, wherein the TPM quote is related to at least a portion of a data stream received from the one client device.

Example 138

This example includes the elements of example 137, wherein the at least a portion of the data stream includes sensor data.

Example 139

This example includes the elements of example 137, wherein the at least a portion of the data stream includes user data.

Example 140

This example includes the elements of example 135, wherein the anti-replay element is selected from the group including a nonce, a timestamp and a monotonic counter value.

Example 141

This example includes the elements according to any one of examples 131 through 133, wherein the instructions that when executed by one or more processors results in the following additional operations including requesting the TPM quote, the TPM quote received in response to the request.

Example 142

This example includes the elements according to any one of examples 131 through 133, wherein the AIK public key is received with a data stream from one client device of a plurality of client devices.

Example 143

This example includes the elements according to any one of examples 131 through 133, wherein the instructions that when executed by one or more processors results in the following additional operations including storing the AIK public key and an associated AIK identifier.

Example 144

This example includes the elements according to any one of examples 131 through 133, wherein the instructions that when executed by one or more processors results in the following additional operations including retrieving the AIK public key from a metadata access point interface.

Example 145

This example includes the elements according to any one of examples 131 through 133, wherein verifying that the AIK public key corresponds to the authenticated client device includes determining whether the AIK public key corresponds to at least one of an AIK identifier and/or a hardware identifier associated with the authenticated client device.

Example 146

This example includes the elements according to any one of examples 131 through 133, wherein the AIK public key is a second AIK public key, the authenticated client device authenticated using a first AIK public key.

Example 147

This example includes the elements of example 146, wherein the verifying that the AIK public key corresponds to the authenticated client device includes determining whether the second AIK public key has been certified by the first AIK public key.

Example 148

This example includes the elements of example 147, wherein the determining includes determining whether the second AIK public key is related to the first AIK public key.

Example 149

This example includes the elements according to any one of examples 131 through 133, wherein the verifying that the AIK public key associated with the received TPM quote corresponds to the authenticated client device includes comparing the AIK public key associated with the received TPM quote with an AIK public key associated with the authentication of the authenticated client device.

Example 150

This example includes the elements of example 149, wherein the comparing includes comparing respective hashes of the AIK public keys.

Example 151

According to this example, there is provided a device. The device includes means for extending, by a secure controller, a secure hash digest with at least a portion of a data stream or a hash of the at least a portion of the data stream.

Example 152

This example includes the elements of example 151, wherein the extending includes concatenating the secure hash digest with the at least a portion of the data stream or the hash of the at least a portion of the data stream, performing a secure hash operation, and storing a result of the secure hash operation to a platform configuration register (PCR) or an extendable NV (nonvolatile) index contained in a Trusted Platform Module.

Example 153

This example includes the elements of example 151, further including means for generating, by the secure controller, a TPM quote.

Example 154

This example includes the elements of example 153, wherein the TPM quote is generated using an attestation identity key (AIK) private key, the AIK private key related to an identity of an associated client device.

Example 155

This example includes the elements according to any one of examples 151 through 153, wherein the secure hash digest corresponds to an accumulation of a plurality of secure hash digests related to a plurality of portions of the data stream.

Example 156

This example includes the elements according to any one of examples 151 through 153, wherein the secure hash digest is stored in a platform configuration register (PCR).

Example 157

This example includes the elements according to any one of examples 151 through 153, wherein the secure hash digest is stored in an extendable NV (nonvolatile) index.

Example 158

This example includes the elements according to any one of examples 151 through 153, further including means for acquiring, by a peripheral device, the peripheral data stream.

Example 159

This example includes the elements of example 158, wherein the peripheral device is a sensor and the data stream includes sensor data.

Example 160

This example includes the elements of example 158, wherein the peripheral device is a user interface and the data stream includes user data.

Example 161

This example includes the elements according to any one of examples 151 through 153, further including means for storing, by each of at least one key slot, a respective attestation identity key (AIK) private key.

Example 162

This example includes the elements of example 161, including means for storing, by a plurality of key slots, the plurality of AIK private keys.

Example 163

This example includes the elements of example 162, wherein a first AIK private key is used to authenticate a client device and to certify a second AIK.

Example 164

This example includes the elements of example 154, wherein the AIK private key corresponds to a second AIK, a first AIK used to authenticate a client device.

Example 165

This example includes the elements of example 164, wherein the second AIK is certified by a first AIK private key.

Example 166

This example includes the elements of example 165, wherein the certifying includes means for signing, by the secure controller, the second AIK public key and an attribute of the second AIK public key.

Example 167

This example includes the elements according to any one of examples 151 through 153, further including means for transmitting, by a communication interface, the at least a portion of the data stream to a server system.

Example 168

This example includes the elements of example 167, further including means for transmitting, by the communication interface, a TPM quote to the server system.

Example 169

This example includes the elements of example 168, wherein the TPM quote is transmitted at least one of periodically and/or in response to a request from the server system.

Example 170

This example includes the elements of example 169, wherein the TPM quote is transmitted periodically based on an amount of data transmitted or based on a time interval.

Example 171

This example includes the elements of example 153, wherein the TPM quote includes the secure hash digest and an appended anti-replay element.

Example 172

This example includes the elements of example 171, wherein the anti-replay element is selected from the group including a nonce, a timestamp and a monotonic counter value.

Example 173

This example includes the elements of example 154, wherein the AIK is used to authenticate the client device.

Example 174

This example includes the elements according to any one of examples 151 through 153, wherein the secure hash digest corresponds to an accumulation of a plurality of secure hash digests related to a respective plurality of portions of each of a plurality of data streams.

Example 175

This example includes the elements according to any one of examples 151 through 153, wherein the secure hash digest is stored in one platform control register (PCR) of a plurality of PCRs contained in a Trusted Platform Module (TPM).

Example 176

This example includes the elements of example 175, wherein the TPM further includes an extendable NV (nonvolatile) index.

Example 177

This example includes the elements of example 175, wherein at least one of the plurality of PCRs is restricted to use by the TPM to support monitoring one or more integrity metrics.

Example 178

This example includes the elements of example 176, wherein the extendable NV index is allocated one or more selected security and/or functional properties.

Example 179

This example includes the elements of example 177, further including means for storing, by one of the at least one restricted PCRs, a secure representation of one or more components included in a client device boot sequence.

Example 180

This example includes the elements according to any one of examples 151 through 153, further including means for hashing, by attest logic, the at least a portion of the data stream, and extending, by the secure controller, the secure hash digest with the hash of the at least a portion of the data stream.

Example 181

According to this example, there is provided a device. The device includes means for verifying, by verifier logic, that an attestation identity key (AIK) public key associated with a received Trusted Platform Module (TPM) quote corresponds to an authenticated client device.

Example 182

This example includes the elements of example 181, further including means for verifying, by the verifier logic, a signature of the TPM quote.

Example 183

This example includes the elements of example 181, further including means for verifying, by the verifier logic, a secure hash digest associated with the TPM quote.

Example 184

This example includes the elements according to any one of examples 181 through 183, wherein the TPM quote corresponds to an accumulation of a plurality of secure hash digests related to a plurality of portions of a received data stream.

Example 185

This example includes the elements of example 182, wherein verifying the signature includes determining whether an anti-replay element is correct.

Example 186

This example includes the elements according to any one of examples 181 through 183, wherein the TPM quote is received from one client device of a plurality of client devices.

Example 187

This example includes the elements of example 186, wherein the TPM quote is related to at least a portion of a data stream received from the one client device.

Example 188

This example includes the elements of example 187, wherein the at least a portion of the data stream includes sensor data.

Example 189

This example includes the elements of example 187, wherein the at least a portion of the data stream includes user data.

Example 190

This example includes the elements of example 185, wherein the anti-replay element is selected from the group including a nonce, a timestamp and a monotonic counter value.

Example 191

This example includes the elements according to any one of examples 181 through 183, further including means for requesting, by the verifier logic, the TPM quote, the TPM quote received in response to the request.

Example 192

This example includes the elements according to any one of examples 181 through 183, wherein the AIK public key is received with a data stream from one client device of a plurality of client devices.

Example 193

This example includes the elements according to any one of examples 181 through 183, further including means for storing, by a key store, the AIK public key and an associated AIK identifier.

Example 194

This example includes the elements according to any one of examples 181 through 183, further including means for retrieving, by the verifier logic, the AIK public key from a metadata access point interface.

Example 195

This example includes the elements according to any one of examples 181 through 183, wherein verifying that the AIK public key corresponds to the authenticated client device includes means for determining, by the verifier logic, whether the AIK public key corresponds to at least one of an AIK identifier and/or a hardware identifier associated with the authenticated client device.

Example 196

This example includes the elements according to any one of examples 181 through 183, wherein the AIK public key is a second AIK public key, the authenticated client device authenticated using a first AIK public key.

Example 197

This example includes the elements of example 196, wherein the verifying that the AIK public key corresponds to the authenticated client device includes means for determining, by the verifier logic, whether the second AIK public key has been certified by the first AIK public key.

Example 198

This example includes the elements of example 197, wherein the determining includes means for determining, by the verifier logic, whether the second AIK public key is related to the first AIK public key.

Example 199

This example includes the elements according to any one of examples 181 through 183, wherein the verifying that the AIK public key associated with the received TPM quote corresponds to the authenticated client device includes means for comparing, by the verifier logic, the AIK public key associated with the received TPM quote with an AIK public key associated with the authentication of the authenticated client device.

Example 200

This example includes the elements of example 199, wherein the comparing includes means for comparing, by the verifier logic, respective hashes of the AIK public keys.

Example 201

According to this example, there is provided a system. The system includes at least one device arranged to perform the method of any one of examples 51 to 80.

Example 202

According to this example, there is provided a device. The device includes means to perform the method of any one of examples 51 to 80.

Example 203

According to this example, there is provided a computer readable storage device having stored thereon instructions that when executed by one or more processors result in the following operations including: the method according to any one of examples 51 to 80.

Example 204

According to this example, there is provided a system. The system includes at least one device arranged to perform the method of any one of examples 81 to 100.

Example 205

According to this example, there is provided a device. The device includes means to perform the method of any one of examples 81 to 100.

Example 206

According to this example, there is provided a computer readable storage device having stored thereon instructions that when executed by one or more processors result in the following operations including: the method according to any one of examples 81 to 100.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A client device, comprising:
   a processor;
   a communication interface configured to establish a communication link with a server system;
   a non-transitory computer readable medium having one or more instructions stored thereon, which, when executed by said processor, cause said client device to carry out the following operations:
   establishing said communication link with said server system; and
   transmitting, via said communication link, a data stream to said server system; and
   a Trusted Platform Module (TPM) comprising:
   a secure controller to perform extending operations to generate an accumulated hash digest, said extending operations comprising:
   concatenating a current hash digest with a received hash value or at least a portion of said data stream to generate a concatenated hash digest; and
   hashing said concatenated hash digest to generate said accumulated hash digest;
   a first private attestation identity key (AIK) to authenticate said client device;
   a second private AIK being used to generate a TPM quote based on said accumulated hash digest to be transmitted to said server system by using said second private AIK to sign said accumulated hash digest; and
   a public AIK to be transmitted to said remote server, said public AIK being associated with said second private AIK, wherein said public AIK is signed using said first private AIK to certify that the first private AIK and said second private AIK are contained in the TPM.

2. The client device of claim 1, further comprising computer readable instructions to effect generating said TPM quote.

3. The client device of claim 2, further comprising computer readable instructions to effect generating said TPM quote using said second private AIK, the second private AIK being related to an identity of the client device.

4. The client device of claim 1, wherein the received hash value corresponds to an accumulation of a plurality of secure hash digests related to a plurality of portions of the data stream.

5. A method comprising:
   establishing a communication link with a server system;
   transmitting, via said communication link, a data stream to said server system;
   in said TPM, performing:
   extending operations to generate an accumulated hash digest, said extending operations comprising:
   concatenating a current hash digest with a received hash value or at least a portion of said data stream to generate a concatenated hash digest; and
   hashing said concatenated hash digest to generate said accumulated hash digest;
   authenticating said client device with a first private attestation identity key (AIK);
   signing said accumulated hash digest with a second private AIK to generate a TPM quote based on said accumulated hash digest to be transmitted to said server system;
   transmitting a public AIK to said remote server, said public AIK being associated with said second private AIK, wherein said public AIK is signed using said first private AIK to certify that the first private AIK and said second private AIK are contained in the TPM.

6. The method of claim 5, wherein the TPM quote is generated using said second private AIK, the second private AIK being related to an identity of an associated client device.

7. The method of claim 5, wherein the received hash value corresponds to an accumulation of a plurality of secure hash digests related to a plurality of portions of the data stream.

* * * * *